United States Patent [19]

Minard et al.

[11] Patent Number: 4,948,270

[45] Date of Patent: Aug. 14, 1990

[54] OIL FLUSHING ADAPTER

[75] Inventors: Paul G. Minard, Winter Springs; Robert C. Hurman, Tampa, both of Fla.; William A. Weiland, Chance, Md.

[73] Assignee: Westinghouse Electric Corp., Pittsburgh, Pa.

[21] Appl. No.: 422,260

[22] Filed: Oct. 16, 1989

[51] Int. Cl.⁵ .............................................. F16C 33/10
[52] U.S. Cl. .................................... 384/399; 384/448; 384/473; 384/624
[58] Field of Search ............... 384/399, 398, 448, 373, 384/473, 624

[56] References Cited

U.S. PATENT DOCUMENTS

| | | | |
|---|---|---|---|
| 2,570,134 | 10/1951 | Lancaster et al. | 384/99 |
| 4,717,000 | 1/1988 | Waddington et al. | 384/473 |
| 4,758,100 | 7/1988 | Güttinger | 384/399 |
| 4,836,334 | 6/1989 | Vermeiren et al. | 384/399 |

Primary Examiner—Lenard A. Footland

[57] ABSTRACT

An oil flushing adapter includes a pair of conduits which are connected at the same point to a bearing support at opposite sides of a rotor, and then pushed apart by an extension device to force the lower ends of the two conduits into sealing contact with a pair of oil outlets. The conduits are then provided with flushing hoses, valves and strainers to sample oil at the bearings for cleanliness, and to shut off oil flow when the oil is sufficiently clean.

20 Claims, 2 Drawing Sheets

OIL FLUSHING ADAPTER

BACKGROUND OF THE INVENTION

1. Field of the Invention

The present invention relates generally to steam turbines and, more specifically, to an oil flushing adapter used to improve the flushing of the oil supply piping to the rotor bearings of a steam turbine with the rotor in place.

2. Description of the Related Art

Near the end of a turbine outage in, especially one which the bearing oil system has been violated, it is desirable to perform an oil flush operation whereby oil is pumped through the system to flush out contaminants. The oil is sampled at each bearing location to verify system cleanliness. The oil flush is to be performed as late as possible in the outage with the turbine reassembled to the fullest extent possible.

FIG. 1 shows one type of bearing configuration in which oil passages through a lower bearing support ring are not easily accessible for tapping or bolt-on conventional flushing blocks, adapters or plates, A typical bolt-on adapter is shown in FIG. 2. Conventional flushes of the type conducted with the apparatus illustrated in FIG. 1 were conducted with uncontrolled oil flushing, without provision for collection and sampling. Flushes using temporary adapter flushing plates as shown in FIG. 2 can only be used when the oil passages of the bearing support or lower half of the bear are easily accessible.

It is desirable to be able to collect the oil which flows to a bearing for sampling, and to be able to shut off the flow of oil at a bearing when it has been verified as clean. This increases the flow of oil to other bearings, thereby hastening the flushing process.

SUMMARY OF THE INVENTION

An object of the present invention is to provide an oil flushing adapter which facilitates collection and sampling of oil during a flushing operation.

Another object of the present invention is to provide an oil flushing adapter which enables the shut off of oil flow at the bearing when the oil has been verified as clean.

Yet another object of the present invention is to provide an oil flushing adapter which enables a flushing operation to be performed more quickly and effectively.

Another object of the present invention is to provide an oil flushing adapter which allows an oil flushing operation to be carried out with the rotor in place.

In a preferred embodiment, an oil flushing adapter for a rotor bearing mounted in a bearing support ring having at least one pair of opposed oil outlets disposed on opposite sides of a rotor includes a first conduit having two open opposite axial ends, a second conduit having two open opposite axial ends, one end of the first conduit being in communication with one of the oil outlets and one end of the second conduit being in communication with the other oil outlet, first means for connecting the first conduit to the bearing support ring, second means for connecting the second conduit to the bearing support ring, the first and second connecting means being substantially coplanar, and extension means, disposed between the oil outlets and the first and second connector means, for pushing the one end of the first and second conduits towards the corresponding oil outlets.

These, together with other objects and advantages which will subsequently become apparent, reside in the details of construction and operation of the invention as more fully hereinafter described and claimed, reference being made to the accompanying drawings forming a part hereof, wherein like reference numerals refer to like parts throughout.

DETAILED DESCRIPTION OF THE PREFERRED EMBODIMENTS

Figure 1:
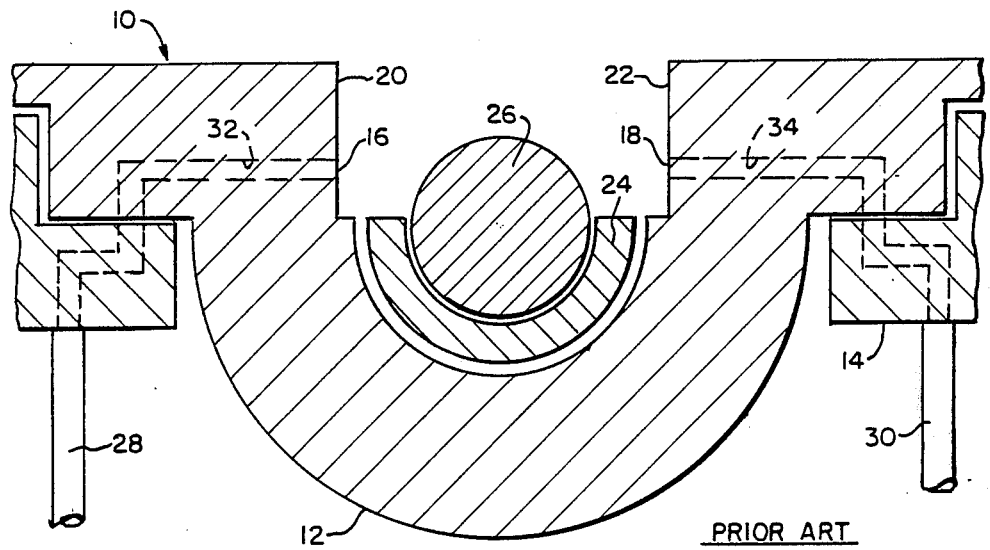
FIG. 1 is a schematic cross-sectional view of a known bearing assembly representative of a type capable of using the oil flushing adapter of the present invention.
Figure 2:
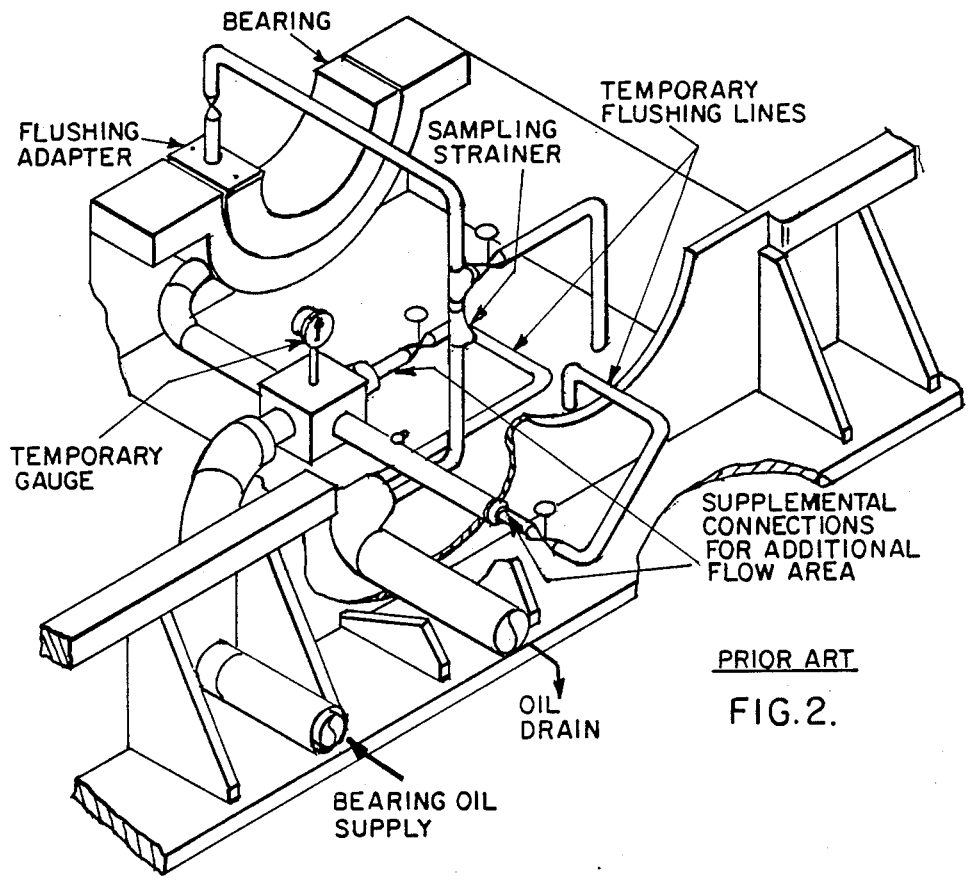
FIG. 2 is a perspective view, partially cut-away, showing a known bearing assembly of a type in which a typical flushing adapter can be used.

Referring to FIG. 1, a known bearing assembly for a sleeve-type bearing is generally referred to by the numeral 10. The assembly includes a lower bearing support ring 12 carried by a bearing support 14. Oil outlets 16 and 18 provided in the lower bearing support ring 12 are provided in vertical side walls 20 and 22, respectively, of the bearing support ring 12.

A bearing 24 supports a turbine rotor 26 thereon, although the top half of the bearing and support ring are removed. Oil inlet pipes 28 and 30 communicate oil to the bearing through passages 32 and 34, respectively, extending through the lower bearing support ring 12 and bearing support 14.

In the past, oil delivered to the inlet pipes 28 and 30 was allowed to pass uncollected and flow freely to drain. Thus, sampling and isolation was not possible.

Figure 3:
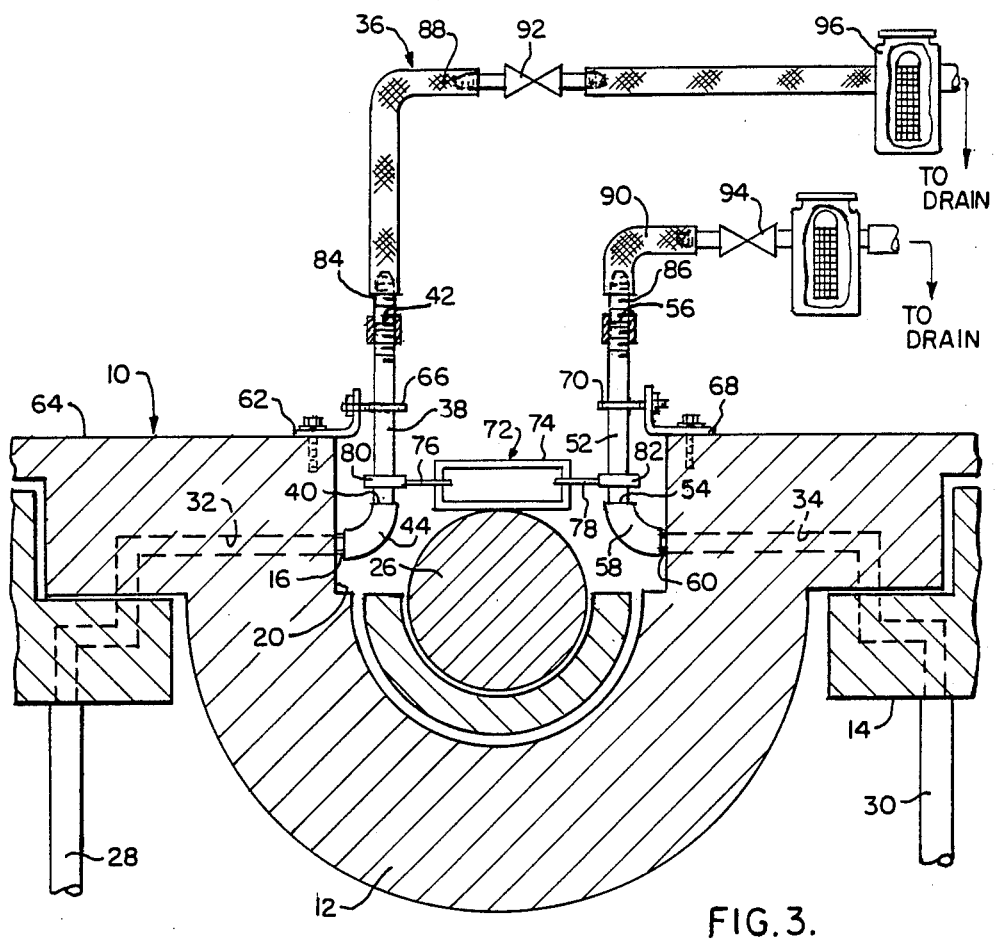
FIG. 3 is a schematic cross-sectional view of a preferred embodiment of the present invention.
Figure 4:
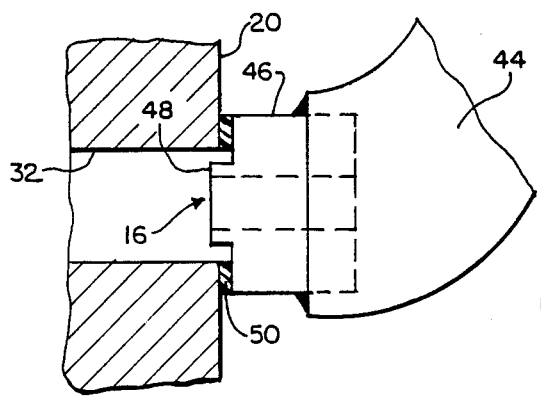
FIG. 4 is an enlarged side elevational view of a stub and lip portion of an elbow used in the preferred embodiment of FIG. 3.

Referring now to FIG. 3, an oil flushing adapter is generally referred to by the numeral 36, and includes a first substantially rigid conduit 38 having two open opposite axial ends 40 and 42. The lower end 40 is connected to a first elbow 44 as in a threaded coupling or other suitable connecting means. Details of the elbow 44 are shown in FIG. 4, which is an enlargement of the area where the elbow is connected to the oil outlet 16 to thereby connect the passage 32 to the first conduit 38. A stub 46 is fixedly connected to the lower end of the elbow 44 by, for example, welding (in case metal parts are used). The stub 46 has a lip 48 which extends into the oil outlet 16 to help insertion and sealing. A gasket 50 is provided between the vertical side wall 20 around the periphery of the oil outlet 16 to enhance the seal.

A mirror image structure is provided opposite the first conduit 38, including a second conduit having opposite axial ends 54 and 56, a second elbow 58 and stub 60.

A first bracket 62 having horizontal and vertical portions is bolted to the lower bearing support ring at its upper horizontal surface 64 by using bolts threadedly received in holes already provided in the lower bearing support ring 12. A first clamp 66, such as a U-bolt, adjustably connects the first conduit 38 to the first bracket 62 at the vertical portion thereof so as to provide a rigid connection between the lower bearing support ring 12 and the first conduit 38.

Similarly, a second bracket 68 is bolted to the upper horizontal surface 64 of the lower bearing support ring 12. A second clamp 70 adjustably connects the second conduit 52 to the second bracket 68. Preferably, the first and second clamps 66 and 70 are substantially coplanar.

In order to improve sealing at the oil outlets, an extension device 72 is provided between the first and second conduits 38 and 52, respectively. The extension device 72 pushes outwardly at its opposite ends to urge the stubs 46 and 60 into their corresponding oil outlets. Preferably, the extension device is mounted just above the rotor 26. In a preferred embodiment, the extension device 72 is a turnbuckle having a body 74, first and second threaded rods 76 and 78 threadedly received in bores provided at opposite ends of the body 74, and end fittings 80 and 82, respectively provided at distal ends of the threaded rods 76 and 78. The end fittings may be of a type that clamp and thereby become adjustably fixed to the corresponding conduits (such as the U-bolts referred to in describing the clamps 66 and 70) or they may be open-ended clevis-type fittings which open away from the turnbuckle body 74.

As the body 74 is rotated, the rods 76 and 78 advance outwardly or retract inwardly, depending on the direction of rotation, so as to exert a compressive force between the first and second conduits.

Adapters 84 and 86 have their one ends fixedly connected to corresponding upper ends of the first and second conduits 38 and 52, respectively. The other ends of the adapters receive flushing hoses 88 and 90, respectively.

A first valve 92 is provided in flushing hose 88 and a second valve 94 is provided in flushing hose 90 both houses lead to a drain. A sample strainer 96 is provided in the flushing hose 88 downstream of the valve 92. The sample strainer could have been provided in the flushing hose 90 downstream of the valve 94 instead of in flushing hose 88; neither location is preferred over the other.

The sample strainer is used to sample the oil flowing to the bearing. When it is determined, based on sampling, that the oil is sufficiently clean, the valves 94 and/or 96 can be shut to cut off the flow of oil to the oil piping leading to the bearings. This increases the flow of oil to other lines, thereby speeding up the flushing process. Thus, oil flow to the bearings can be accurately sampled and then shut off when clean to divert the flow to other bearings. "Sampling" can be performed by any conventional method. In the most basic application, the sample strainer is simply a filter that can be visually inspected.

Numerous alterations and modifications of the structure herein disclosed will suggest themselves to those skilled in the art. It is to be understood, however, that the present disclosure relates to the preferred embodiments of the invention which are for purposes of illustration only and are not to be construed as a limitation of the invention. All such modifications which do not depart from the spirit of the invention are intended to be included within the scope of the appended claims.

We claim:

1. An oil flushing adapter for a rotor bearing mounted in a bearing support ring having at least one pair of opposed oil outlets disposed on opposite sides of a rotor, the adapter comprising:
    a first conduit having two open opposite axial ends;
    a second conduit having two open opposite axial ends;
    one end of the first conduit being in communication with one of the oil outlets and one end of the second conduit being in communication with the other oil outlet;
    first means for connecting the first conduit to the bearing support ring;
    second means for connecting the second conduit to the bearing support ring;
    the first and second connecting means being substantially coplanar; and
    extension means, disposed between the oil outlets and the first and second connector means, for pushing the one end of the first and second conduits towards the corresponding oil outlets.

2. An oil flushing adapter as recited in claim 1, further comprising a first flushing hose connected to the opposite end of the first conduit and leading to a drain, a first shut-off valve disposed in the first flushing hose and first sampler means disposed in the first flushing hose downstream of the first valve for sampling oil, the first valve being closed when oil sampled in the first sampler means has obtained a predetermined level of cleanliness.

3. An oil flushing adapter as recited in claim 2, further comprising a second flushing hose leading to a drain and being connected to the opposite end of the second conduit, and a second shut-off valve disposed in the second flushing hose the second valve being closed when oil sampled in the sampler means indicates a predetermined level of cleanliness.

4. An oil flushing adapter as recited in claim 1, wherein the first conduit includes a first elbow having one end releasably connected to the corresponding oil outlet.

5. An oil flushing adapter as recited in claim 4, wherein the first elbow includes a stub and lip for interfitting in the corresponding oil outlet.

6. An oil flushing adapter as recited in claim 1, wherein the second conduit includes a second elbow having one end releasably connected to the corresponding oil outlet.

7. An oil flushing adapter as recited in claim 5, wherein the second elbow includes a stub and lip for interfitting in the corresponding oil outlet.

8. An oil flushing adapter as recited in claim 1, wherein the first connecting means includes a first bracket detachably connected to the bearing support ring and a first clamp adjustably connected to the first conduit and the first bracket.

9. An oil flushing adapter as recited in claim 1, wherein the second connecting means includes a second bracket detachably connected to the bearing support ring and a second clamp detachably connected to the second conduit and the second bracket.

10. An oil flushing adapter as recited in claim wherein the extension means comprises a turnbuckle having first and second end fittings respectively connected to the first and second conduits.

11. An oil flushing adapter as recited in claim 10, wherein the turnbuckle includes first and second rods threadedly received in opposite axial ends of the body and having distal ends connected to the first and second end fittings.

12. An oil flushing adapter for a rotor bearing mounted in a bearing support ring having at least one pair of opposed oil outlets disposed on opposite sides of a rotor, the adapter comprising:

a first conduit having two open opposite axial ends;

a second conduit having two open opposite axial ends;

one end of the first conduit being in communication with one of the oil outlets and one end of the second conduit being in communication with the other oil outlet;

first means for connecting the first conduit to the bearing support ring;

second means for connecting the second conduit to the bearing support ring;

the first and second connecting means being substantially coplanar;

extension means, disposed between the oil outlets and the first and second connector means, for pushing the one end of the first and second conduits towards the corresponding oil outlets;

the first connecting means including a first bracket detachably connected to the bearing support ring and a first clamp adjustably connected to the first conduit and the first bracket; and the second connecting means including a second bracket detachably connected to the bearing support ring and a second clamp detachably connected to the second conduit and the second bracket.

13. An oil flushing adapter as recited in claim 12, further comprising a first flushing hose connected to the opposite end of the first conduit and leading to a drain, a first shut-off valve disposed in the first flushing hose and first sampling means disposed in the first flushing hose downstream of the first valve for sampling oil and leading to a drain, the first valve being closed when oil sampled in the first sampler means has obtained a predetermined level of cleanliness.

14. An oil flushing adapter as recited in claim 13, further comprising a second flushing hose connected to the opposite end of the second conduit and leading to a drain, a second shut-off valve disposed in the second flushing hose the second shut-off valve being closed when oil sampled in the sampler means indicates a predetermined level of cleanliness.

15. An oil flushing adapter as recited in claim 12, wherein the first conduit includes a first elbow having one end releasably connected to the corresponding oil outlet.

16. An oil flushing adapter as recited in claim 15, wherein the first elbow includes a stub and lip for interfitting in the corresponding oil outlet.

17. An oil flushing adapter as recited in claim 12, wherein the second conduit includes a second elbow having one end releasably connected to the corresponding oil outlet.

18. An oil flushing adapter as recited in claim 16, wherein the second elbow includes a stub and lip for interfitting in the corresponding oil outlet.

19. An oil flushing adapter as recited in claim 12, wherein the extension means comprises a turnbuckle having first and second end fittings respectively connected to the first and second conduits.

20. An oil flushing adapter as recited in claim 19, wherein the turnbuckle includes first and second rods threadedly received in opposite axial ends of the body and having distal ends connected to the first and second end fittings.

* * * * *